Feb. 2, 1937.  E. R. SMITH  2,069,426
FOLLOW REST
Filed May 11, 1935  2 Sheets-Sheet 1
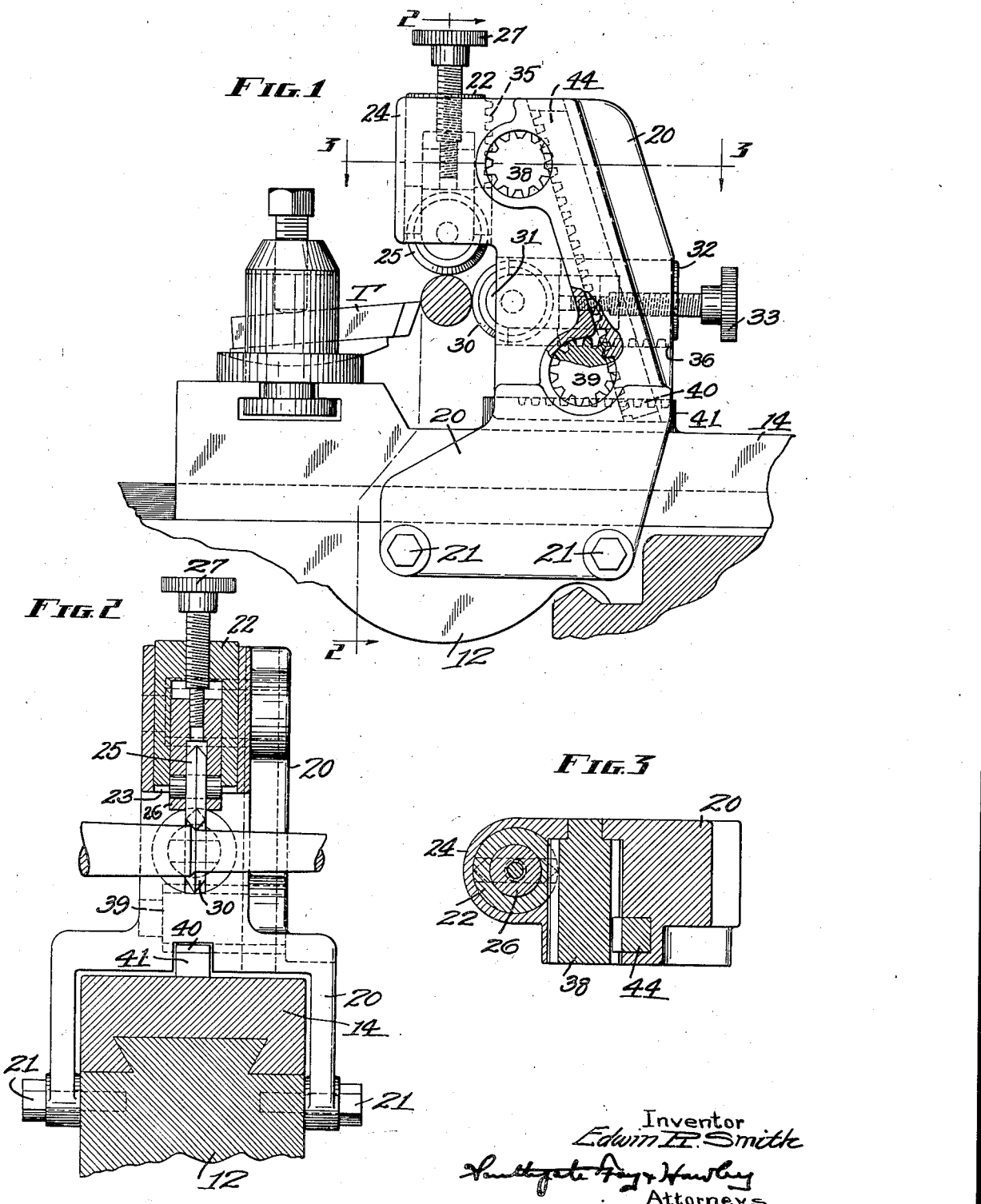
Inventor
Edwin R. Smith
Attorneys Feb. 2, 1937.　　　　E. R. SMITH　　　　2,069,426
FOLLOW REST
Filed May 11, 1935　　　　2 Sheets-Sheet 2
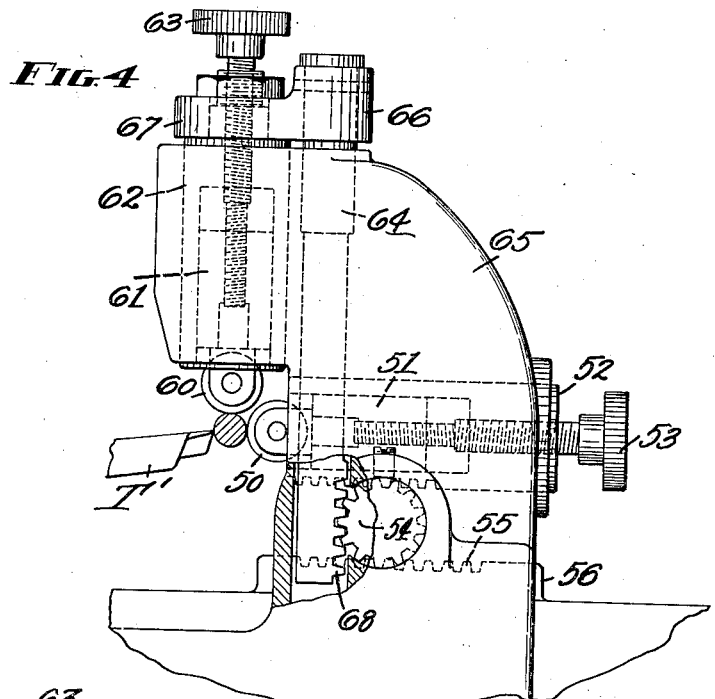
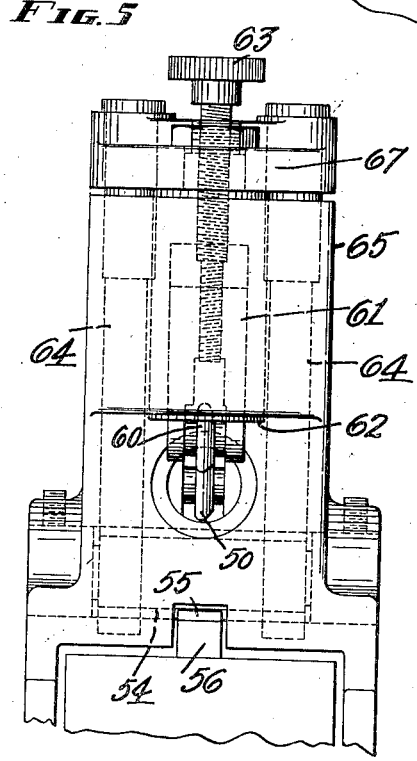
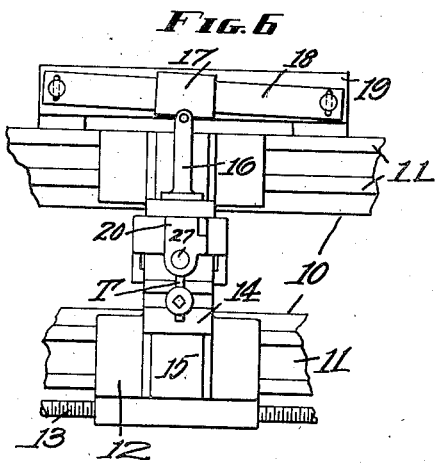
Inventor
Edwin R. Smith.
Southgate Fry & Hawley
Attorneys Patented Feb. 2, 1937

2,069,426

UNITED STATES PATENT OFFICE 2,069,426

FOLLOW REST

Edwin R. Smith, Seneca Falls, N. Y., assignor to Seneca Falls Machine Company, Seneca Falls, N. Y., a corporation of Massachusetts Application May 11, 1935, Serial No. 21,015

1 Claim. (Cl. 82—35)

This invention relates to lathes and other machine tools for producing rotary work by cutting or grinding operations, and relates more particularly to the provision of an improved follow rest or steady rest therefor.

It is the general object of my invention to provide an improved form of follow rest adapted for use on tapered or irregular work in which the diameter changes as the machine operation proceeds axially.

More specifically, I provide a construction of follow rest by which the work-engaging parts of the rest are automatically advanced or withdrawn relative to the work in accordance with the relative advance or withdrawal of the tool.

My invention further relates to arrangements and combinations of parts which will be hereinafter described and more particularly pointed out in the appended claim.

Two forms of the invention are shown in the drawings, in which

Fig. 1 is a side elevation, partly in section, of a follow rest embodying my improvements;

Fig. 2 is a sectional front elevation, taken along the line 2—2 in Fig. 1;

Fig. 3 is a sectional plan view, taken along the line 3—3 in Fig. 1;

Fig. 4 is a side elevation, partly in section, showing a modified construction;

Fig. 5 is a front elevation thereof, and

Fig. 6 is a plan view of portions of a machine tool having my invention applied thereto.

Referring to Fig. 6, I have shown portions of the frame or bed 10 of a lathe or other similar machine tool. Guideways 11 are provided on the bed 10 for a tool carriage 12 which is movable axially of the machine by a feed screw 13.

A tool slide 14 is mounted on a transverse guideway 15 on the tool carriage 12 and may be connected by a link or arm 16 to a block 17 slidable on a taper bar or cam bar 18, adjustably secured to a bracket 19 mounted on the rear side of the bed 10. The ordinary hand feeding devices for the cross slide 14 may also be provided, for use when the taper bar attachment is disconnected.

All of these parts are or may be of the usual commercial construction and in themselves form no part of my present invention.

A stand 20 (Figs. 1 and 2) is secured to the intermediate or bridge portion of the tool carriage 12 by clamping bolts 21, so that the stand 20 is mounted in fixed relation to the tool carriage and is separate from the tool slide 14.

A plunger 22 is vertically slidable in a recess or guideway 23 formed in the forwardly offset upper end portion 24 of the stand 20.

A work-engaging follow roll 25 is rotatably mounted in a bearing block 26 which is slidable vertically in a recess in the plunger 22 and which may be adjusted vertically therein by the manually operated adjusting screw 27 which is shown in Fig. 1 as being provided with right and left-hand threads and as being threaded into the plunger 22 and the block 26 respectively. Both the plunger 22 and the block 26 are keyed or otherwise secured against angular movement but are free to be moved or adjusted vertically as described.

A second work-engaging roll 30 is mounted in a bearing block 31 slidable in a second plunger 32 and adjustable therein by an adjusting screw 33, all as previously described.

The plunger 22 is provided with rack teeth 35 on its rear face and the plunger 32 is provided with rack teeth 36 on its lower face. The rack teeth 35 are engaged by a pinion 38 rotatably mounted in the stand 20, and the rack teeth 36 are engaged by a similar pinion 39 also rotatably mounted in the stand 20.

The pinion 39 is engaged by rack teeth 40 formed on an upward projection 41 of the tool slide 14. The pinion 39 also engages a rack bar 44, slidable in guideways in the stand 20. The upper portion of the rack bar 44 engages the upper pinion 38.

With these connections, it will be evident that forward or rearward movement of the tool T mounted on the tool slide 14 will cause corresponding movement of the rack teeth 40 on the projection 41, which rack teeth in turn will rotate the pinion 39. As the pinion 39 directly engages the rack teeth 36 on the plunger 32, the plunger will receive a corresponding and equal movement toward or away from the work, but in the opposite direction from the movement of the tool T.

Furthermore, as the pinion 39 is connected through the rack bar 44 to the upper pinion 38, which in turn meshes with the rack teeth 35 on the upper plunger 22, the described movement of the tool T will cause simultaneous vertical movement of the upper plunger 22 and the roll 25.

As the tool advances to cut the work to a smaller diameter, the rolls 25 and 30 correspondingly advance to maintain engagement with the work on its reduced diameter. If the tool T is withdrawn to increase the diameter, the rolls 25 and 30 are correspondingly withdrawn.

The screws 27 and 33 are used for initially adjusting the rolls 25 and 30 to engage the work at the line determined by the tool T.

With the construction described, I am able to produce work of varying diameter and I am also able to fully support and steady the work in every position of the cutting tool or grinding wheel.

In Figs. 4 and 5 I have shown a slightly modified construction in which the lower roll 50, bearing block 51, plunger 52 and adjusting screw 53 are all as previously described and are directly operated by the pinion 54 which is engaged by rack teeth 55 on the tool slide projection 56.

The upper roll 60, bearing block 61, plunger 62 and adjusting screw 63 are all as previously described but the means for advancing or withdrawing the roll 60 is somewhat different.

A pair of longitudinally movable bars 64 are mounted in guideways in the stand 65 and at their upper ends are provided with a head 66 having an offset arm 67 to which the plunger 62 is secured. At their lower ends the bars 64 are provided with rack teeth 68 engaging the pinion 54. As the tool T' is advanced or withdrawn, the rolls 50 and 60 are correspondingly advanced or withdrawn, all as previously described.

This construction is somewhat simpler than the previous form, as the upper pinion 38, the rack teeth 35 on the plunger 22 and the rack teeth at the upper end of the rack bar 44 are all omitted. Otherwise the operation and advantages of the two forms are essentially the same.

Having thus described my invention and the advantages thereof, I do not wish to be limited to the details herein disclosed, otherwise than as set forth in the claim, but what I claim is:—

In a machine, a tool carriage, a tool slide mounted on said carriage for movement transversely of said machine, a stand fixed on said carriage, a first work-engaging device mounted for vertical movement in said stand, a second work-engaging device mounted for horizontal movement in said stand, a pinion mounted in said stand and engaged by rack teeth on said tool slide and also by rack teeth on said second work-engaging device, and a rack bar mounted for vertical sliding movement in said stand and engaged by said pinion and directly connected at its upper end to said first work-engaging device, whereby rearward and forward adjustment of said tool and tool slide effects equal and simultaneous adjustment of said first and second work-engaging devices toward and away from the work.

EDWIN R. SMITH.